(12) United States Patent
Günther

(10) Patent No.: US 8,681,799 B2
(45) Date of Patent: Mar. 25, 2014

(54) METHOD FOR OPERATING A COMMUNICATION DEVICE AND COMMUNICATION DEVICE THEREFOR

(75) Inventor: Frank Günther, Berlin (DE)

(73) Assignee: Gemalto M2M GmbH, Munich (DE)

( * ) Notice: Subject to any disclaimer, the term of this patent is extended or adjusted under 35 U.S.C. 154(b) by 122 days.

(21) Appl. No.: 12/935,250

(22) PCT Filed: Mar. 23, 2009

(86) PCT No.: PCT/EP2009/053379
§ 371 (c)(1),
(2), (4) Date: Feb. 22, 2011

(87) PCT Pub. No.: WO2009/118289
PCT Pub. Date: Oct. 1, 2009

(65) Prior Publication Data
US 2011/0141986 A1 Jun. 16, 2011

(30) Foreign Application Priority Data
Mar. 28, 2008 (EP) .................................... 08075244

(51) Int. Cl.
*H04L 12/56* (2011.01)
*H04Q 11/00* (2006.01)
*H04L 12/66* (2006.01)

(52) U.S. Cl.
USPC ............ 370/394; 370/359; 370/419; 370/463

(58) Field of Classification Search
USPC .......... 370/329, 464, 465, 469, 522, 527, 529
See application file for complete search history.

(56) References Cited

U.S. PATENT DOCUMENTS

| | | | | |
|---|---|---|---|---|
| 6,487,218 B1 * | 11/2002 | Ludwig et al. | ................ | 370/469 |
| 6,542,504 B1 * | 4/2003 | Mahler et al. | ................. | 370/392 |
| 6,768,749 B1 * | 7/2004 | Osler et al. | .................... | 370/524 |
| 7,158,517 B2 * | 1/2007 | Varelas et al. | ................ | 370/392 |
| 7,519,079 B2 * | 4/2009 | Shah et al. | ..................... | 370/466 |
| 7,835,365 B2 * | 11/2010 | Ayyagari | .................... | 370/395.3 |
| 2002/0181498 A1 * | 12/2002 | Hsu et al. | ...................... | 370/466 |
| 2005/0013326 A1 * | 1/2005 | Vinagre | ........................ | 370/522 |
| 2005/0259687 A1 * | 11/2005 | Abrol et al. | .................... | 370/469 |
| 2006/0146818 A1 * | 7/2006 | Oouchi et al. | ................ | 370/389 |

FOREIGN PATENT DOCUMENTS

EP       1 494 387      1/2005

* cited by examiner

*Primary Examiner* — Warner Wong

(57) ABSTRACT

A communication device and a method concerning the operation of a communication device is provided. The method may include integrating a device control protocol into a point-to-point-protocol (PPP) frame, such that the integrated device control protocol can be separated by means of an identifier. Also, a logic channel between an application layer and a physical layer of the communication device is provided via the integrated device control protocol. At least one virtual serial interface may be provided within the communication device that is configured to use a device control protocol integrated into the PPP frame. The virtual serial interface includes at least one logic channel for an access of applications in an application layer to units of a physical layer of the communication device.

15 Claims, 6 Drawing Sheets

METHOD FOR OPERATING A COMMUNICATION DEVICE AND COMMUNICATION DEVICE THEREFOR

BACKGROUND

1. Technical Field

The technical field relates to communication devices, and more particularly to communication devices utilizing a data link layer and a point-to-point protocol (PPP).

2. Description of the Related Art

The main application of the PPP and the communication devices operating on that basis is in the field of so-called IP networks. That can be for example the Internet but also a private intranet. Using special surfaces and interfaces, for example RS232, IRDA, Bluetooth or Comport by way of USB, a data stream occurring in those networks is serially transmitted. The packet-oriented PPP protocol has prevailed as the general standard for such serialization. A communication device operating on the basis of the PPP can be for example a modem.

The structure of the PPP known from the state of the art provides that whenever there is a data communication such devices completely occupy the interface which is present in that respect on the hardware side. In that case the communication device is in a state which is referred to as the data mode. Additional commands which are not part of the transmitted data stream cannot be sent to the communication device under those conditions. Sending additional commands however is generally performed when for example the so-called AT commands have to be communicated, which are utilized for checking and verifying a link quality, for displaying items of network information about field strengths or network operators, for establishing a charge condition of an accumulator, for terminating a connection and the like further monitoring and control functions.

In addition, particularly in the case of communication devices which fulfill a function as a wireless modem, it is of great significance that, besides data transmission, additional services or applications can be implemented. For that purpose access to the hardware of the communication device is made possible for those services in parallel with the ongoing data transmission. That is the case for example with applications which are intended to serve at any time to drop or accept speech calls, send or receive short messages (SMS) and thus to use further functions of the communication device.

For that purpose some solutions are already known from the state of the art: in a first procedure the communication device is set from a data mode into a so-called command mode. In that case the data transmission is interrupted and the communication device is then available in the command mode for the active application. That switching-over operation is generally effected by special sequences of characters or control signals. In those switching-over operations however the flow of data is considerably slowed down by way of the communication device. In addition the time behavior of protocols on higher abstraction layers is adversely affected.

To send commands to the communication device in parallel with the existing data connection therefore additional physical interfaces are used, by way of which on the one hand the data connection and on the other hand transmission of the commands is implemented. Desirably multiplexer protocols are used, with which a plurality of logic channels can be provided on a physical interface at the communication device, by way of which a plurality of applications can send commands to the communication device. Basically however even with those technical solutions the data mode of the communication device is temporarily terminated and thus the existing data connection is then broken off so that the applications and services operating in the command mode can access the communication device.

In addition implementation and integration of the multiplexer protocol is often linked to additional problems. In part considerable development work is involved to produce such a protocol. A multiplexer protocol also places high demands on the processors and memories in the communication device. Often the multiplexer protocol can only be implemented in limited circumstances.

BRIEF SUMMARY

In one embodiment, a method is provided with which the described disadvantages can be avoided and communication devices with lower levels of processor power and memory resources for genuine parallel operation can be provided and operated without markedly influencing the quality of the data connection. It is to be possible in particular to maintain the data mode of the communication device even when an application operating in the command mode is intended to access the communication device.

One embodiment includes operation of a device control protocol that is incorporated into the PPP frame and can be separated by means of an identifier. The device control protocol provides at least one logic channel between an application layer and a physical layer of the communication device.

The PPP frame of the PPP protocol is expanded by an additional protocol at the level of the data link layer. The additional protocol which is referred to as the device control protocol provides at the level of the PPP, that is to say as part of the point-to-point data transmission in the data mode, a logic channel which is reserved for an application from the application layer and that permits access to the physical layer, that is to say the hardware, of the communication device.

The device control protocol is thus on the one hand a part of the PPP communication operated in the data mode, while on the other hand the device control protocol makes available an access window for applications which normally cannot be executed in the data mode on the communication device. The commands thereof are transmitted so-to-speak 'piggy-back' in the PPP frame. A desirable configuration of the method involves effecting by means of the device control protocol instancing at least two logic channels for the physical access of at least a first application and at least a second application from the application layer to the communication device. In that way a respective dedicated logic channel is provided for each of the applications, and each channel can be separately addressed.

In an advantageous configuration of the method the device control protocol provides at least one virtual serial interface for an application. With such a configuration the respectively accessing application can use the logic channel of the device control protocol like a conventional serial interface.

In an embodiment the at least one first application is a General Packet Radio Service (GPRS) or Universal Mobile Telecommunications System (UMTS) data service and the at least one second application is a service for the transmission of speech and short messages. In that case one of the two services performs a data transmission by way of the above-mentioned virtual serial interface.

A communication device for executing communication operations by means of a point-to-point protocol with a PPP frame includes at least one virtual serial interface. The serial interface is formed by a device control protocol integrated into the PPP frame, with at least one logic channel for an access of applications in an application layer to units of a physical layer of the communication device.

The logic channel of the respective virtual interface is instanced. In that way a respectively independently executable access is possible to the physical layer of the communication device by way of each virtual serial interface.

In an embodiment of the communication device a dialUP, a short message, a telephony and/or a fax application can be executed by way of the at least one virtual serial interface. In a further embodiment of the communication device a speech and/or a short message application can be executed by way of the at least one virtual serial interface.

In a first embodiment the communication device is a wired and/or wireless modem. In a further embodiment the communication device is a personal digital assistant for use in a GPRS and/or UMTS/Downlink Packet Access (HSDPA) data service.

BRIEF DESCRIPTION OF THE SEVERAL VIEWS OF THE DRAWINGS

The method and the communication device are to be described in greater detail hereinafter by means of embodiments by way of example. The same references are used for identical components or components having the same action.

FIG. 1 shows an example abstraction layer model,

FIG. 2 shows a layer model for a known switching-over method between a data mode and a command mode of the communication device, FIG. 3 shows a layer model for a known method with physical interfaces between an application layer and the communication device, FIG. 4 shows a layer model for a known method using a multiplexer protocol, FIG. 5 shows a layer model with a PPP frame and an additional incorporated device control protocol for a logic channel in accordance with a one embodiment, and FIG. 6 shows a layer model with a PPP frame and a plurality of additionally incorporated device control protocols with a plurality of logic channels in accordance with another embodiment.

DETAILED DESCRIPTION

Figure 1:
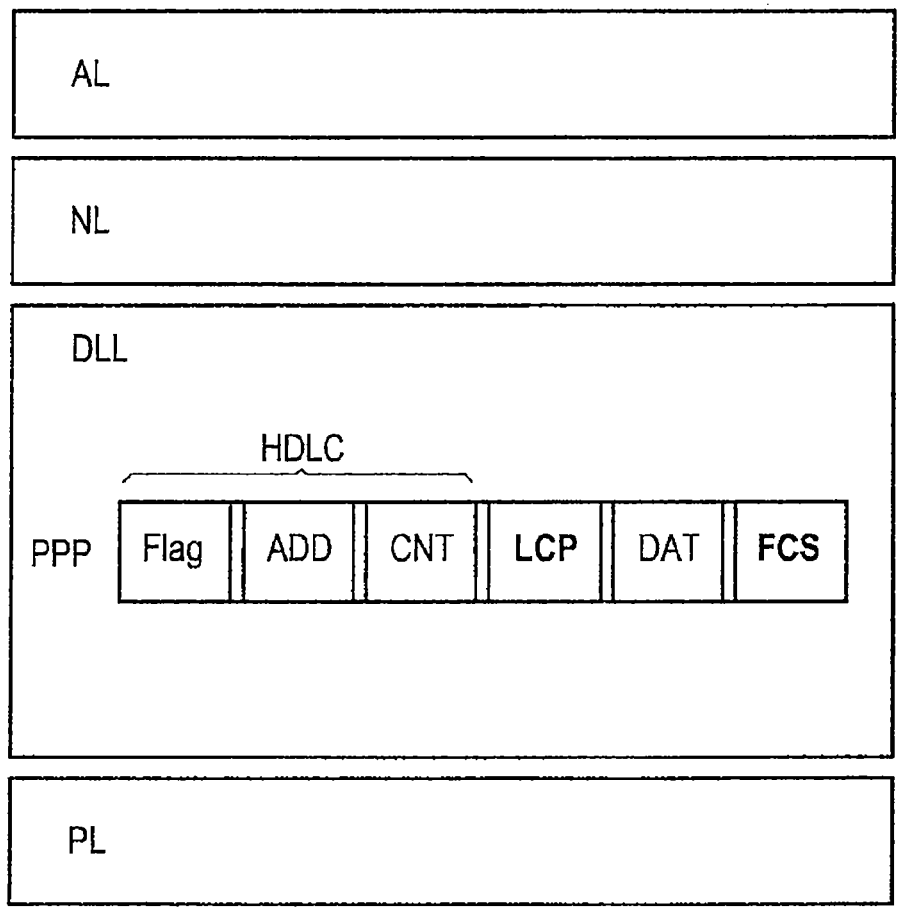
FIGS. 1 through 6 serve for elucidation purposes. In the drawings.

FIG. 1 shows the basic model of data transmission taking place on the communication device. The model has a series of abstraction layers. A layer which is higher in the view forms a virtualization of the respectively subjacent lower layer. That virtualization permits processes or applications in the respectively higher layer to access resources of the lower layer without the specifications of the components or processes in the lower layer having to be known.

The lowest layer forms the directly present hardware and firmware components of the communication device or the signals passed directly by way of the communication device. That layer is referred to as the physical layer PL.

An abstraction stage thereabove is a data link layer DLL. As the most important component it contains basic communication protocols and interfaces for an access of higher processes or applications to the functionalities of the communication device, that are present in the physical layer PL.

In the present case the data link layer DLL contains a point-to-point protocol PPP. The PPP permits the transmission of various higher network protocols such as in particular TCP/IP, IPX or AppleTalk. The structure of the PPP is standardized in RFC 1661. The PPP has gained acceptance as the general communication protocol on the Internet and serves in particular for executing dialing processes between user terminal devices on an Internet provider.

The PPP includes a defined sequence of signals which is referred to as the PPP frame. The first three signals of the PPP frame are compatible with a network protocol which is standardized by the ISO and which is referred to as the high level data link control HDLC. They comprise a boundary flag, an address ADD and a control CNT. The control is also referred to as the HDLC control. Both flag, ADD and CNT are each of a length of 1 byte. Those fields generally carry fixedly predetermined values.

The subsequent constituent of the PPP frame is referred to as the link control protocol LCP. The LCP specifies the code for the packet type of the transmitted user data. A conventional LCP is of a length of between 1 and 2 bytes. Associated with the values of the LCP is a series of protocol types, for example a respectively standardized value for the Internet protocol IP, for a compression control protocol CCP, an IP control protocol IPCP, a password authentification protocol PAP or a challenge handshake authentification protocol CHAP.

The next member of the PPP frame is of a variable length and is reserved for useful data DAT which are transmitted in the packet. The length of the DAT member is respectively established by the value of the LCP field and can be filled up if required. The DAT member is also referred to as the payload.

The last member of the PPP frame is formed by the HDLG check sum FCS. That arises out of cyclic redundancy checking of the members ADD, CNT, LCP and DAT. The FCS member is then followed by the flag member of the PPP frame which follows in the flow of data.

The abstraction layer arranged above the data link layer DLL is formed by a network layer NL. The network layer contains basic communication protocols adapted to different network architectures. An example in this respect is the TCP/IP protocol which forms a standard for communication in worldwide data networks, or also the user datagram protocol UDP.

The highest abstraction layer is formed by an application layer AL. That includes on the one hand typical user applications such as browser, update manager or server, but also authentification and setup programs. The application layer forms a user interface with which a user can use and access the lower functionalities of data communication at the communication device.

Figure 2:
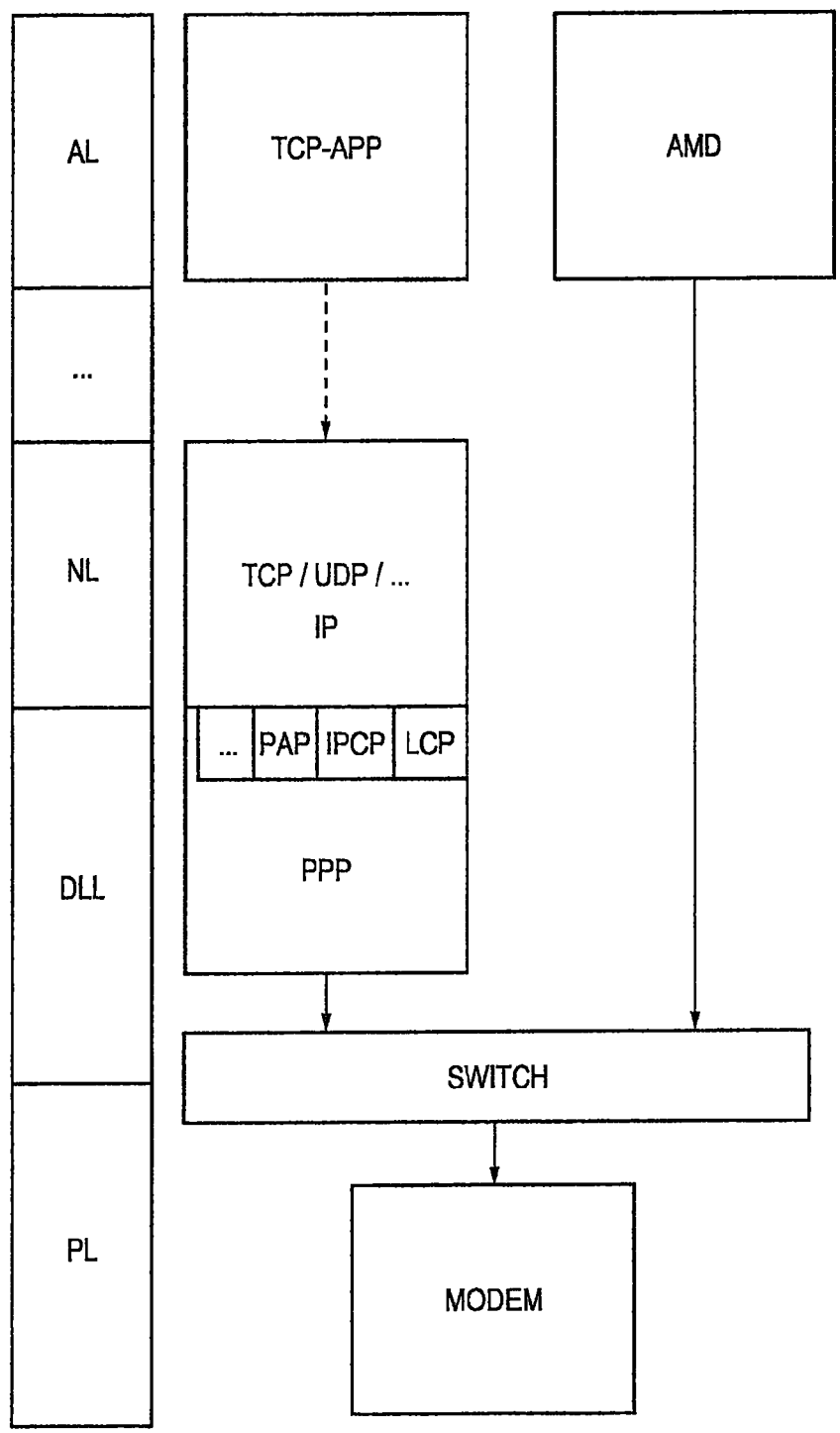

FIG. 2 shows a switching-over method between a data mode and a command mode of the communication device in the model of the abstraction layers. Provided at the level of the physical layer PL is a communication device MODEM. The communication device is operated either in the data mode or in the command mode by means of a switching-over function SWITCH. The switching-over function SWITCH belongs in part to the physical layer PL, it is therefore implemented by certain hardware or firmware components in the communication device. In part however it is also a part of the data link layer DL and is implemented there besides the PPP protocol which has already been described.

In the data mode exclusively the PPP protocol with the network layer NL thereabove, and the protocols TCP/IP or UDP taking place therein are active on the communication device MODEM. An application TCP-AP, for example an Internet browser or an e-mail client, from the application layer AL in this mode access to the full extent the functionalities of the lower layers or the hardware functions of the communication device.

The switching-over function SWITCH is activated by a program AMD for switching over from the data mode into a command mode. The program AMD manages the data links for applications, it can be for example an authentification program, a configuration program, a connection program or a setup program. In that way the data mode is terminated and the command mode is activated at the communication device.

Figure 3:
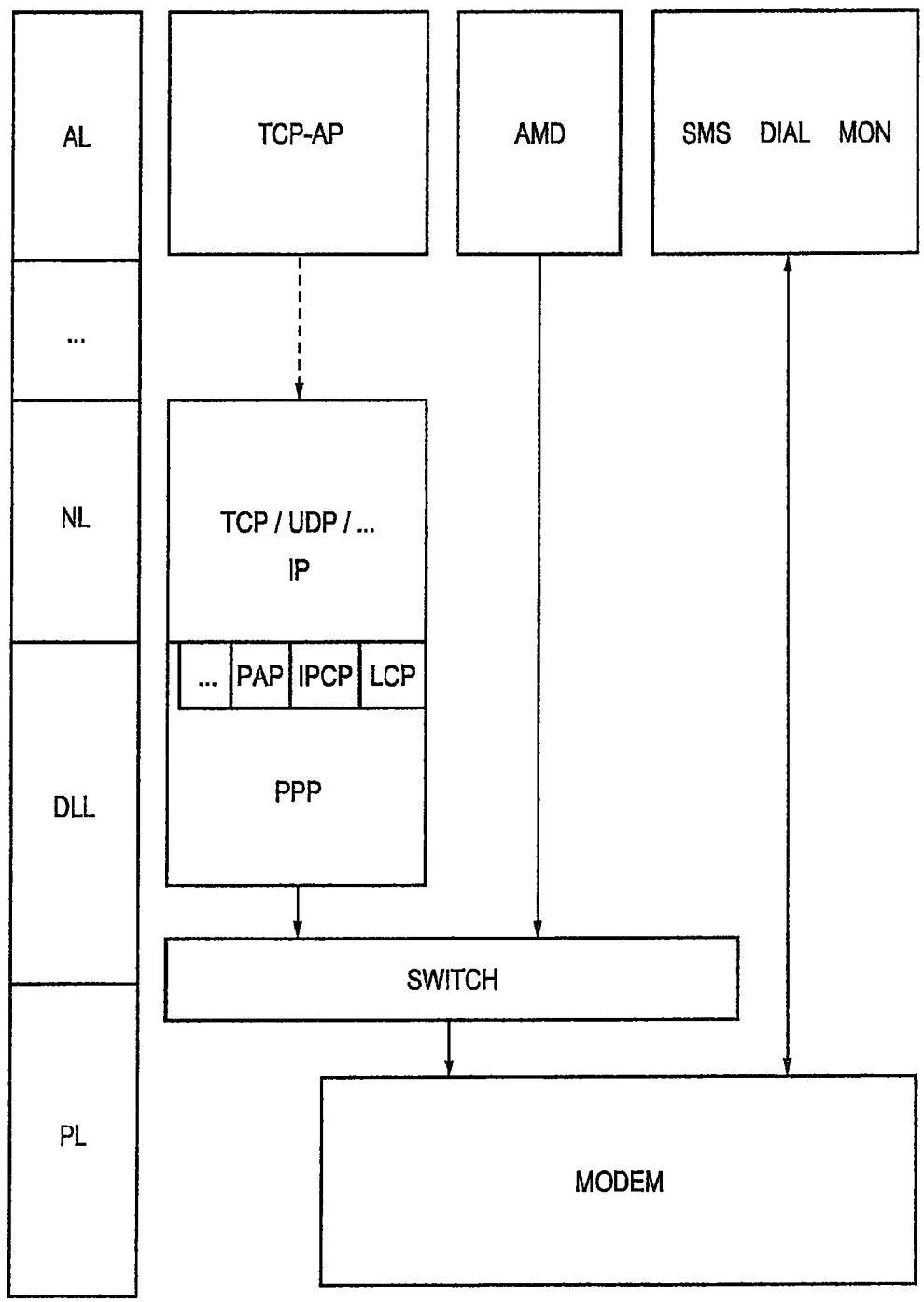

FIG. 3 shows the method using additional physical interfaces between the application layer and the communication device. In addition to the embodiment shown in FIG. 2 a further direct hardware access is provided between an application for sending short messages SMS, a telephony application DIAL and a monitoring program MON in the application layer AL and the communication device MODEM in the physical layer PL. By means of the program AMD in the application layer, by way of the above-mentioned switching-over function SWITCH, the implementation of the PPP protocol and thus the data mode on the device MODEM is terminated and hardware access of the device for one of the applications SMS, DIAL or MON is opened.

Figure 4:
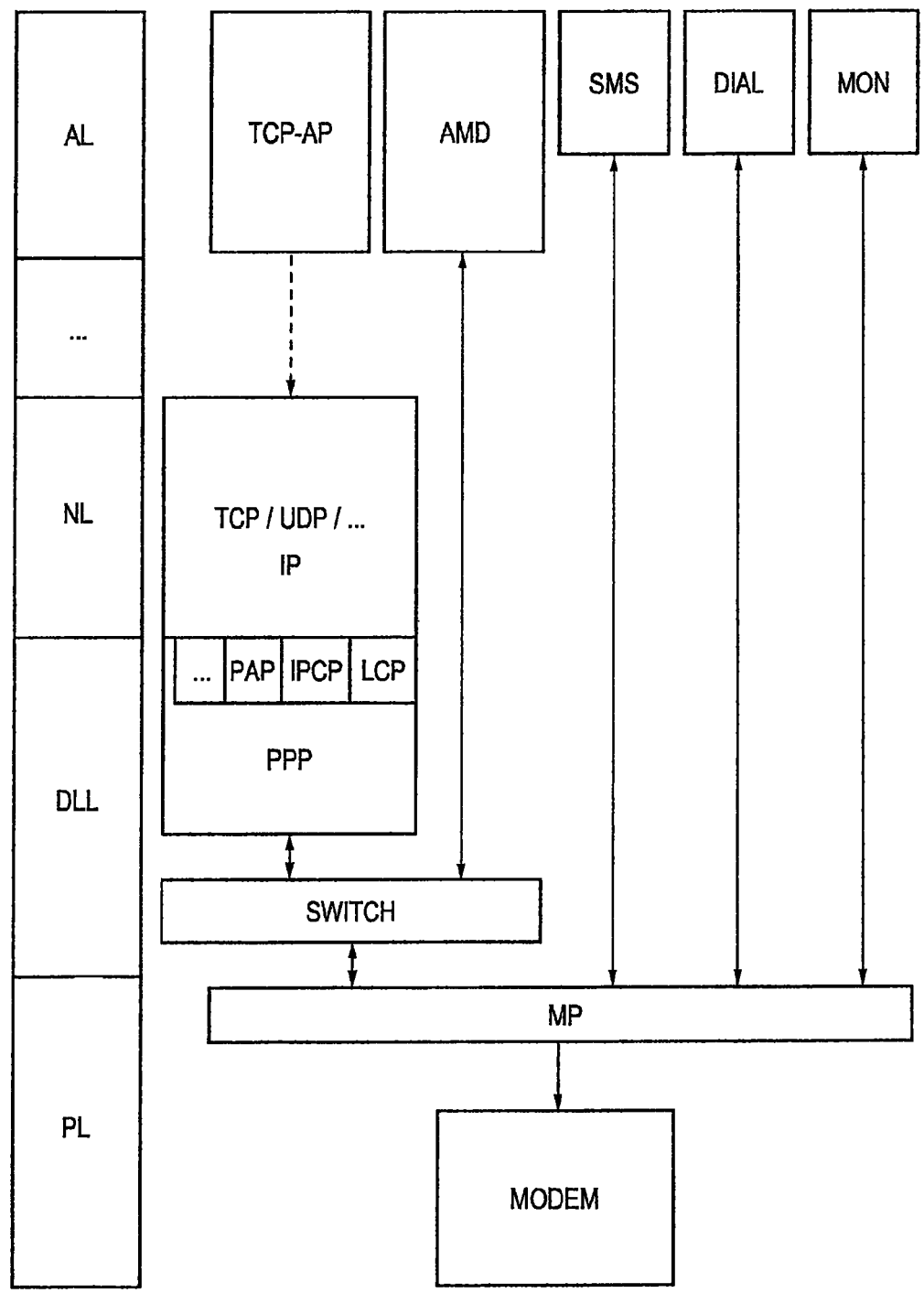

FIG. 4 shows a model for a method using a multiplexer protocol in the layer model. In this embodiment in addition to the components shown in FIGS. 3 and 4, a multiplexer MP is implemented on the level of the physical layer PL. That provides a series of logic associations respectively between the applications SMS, DIAL and MON in the application layer and the device MODEM. In this embodiment the multiplexer MP is implemented in hardware terms. It is activated by the above-mentioned switching-over function SWITCH or the application AMD. The model of the state of the art shown in FIG. 4 accordingly invlves switching-over between the data mode and the command mode at the device MODEM just as in the preceding examples.

Figure 5:
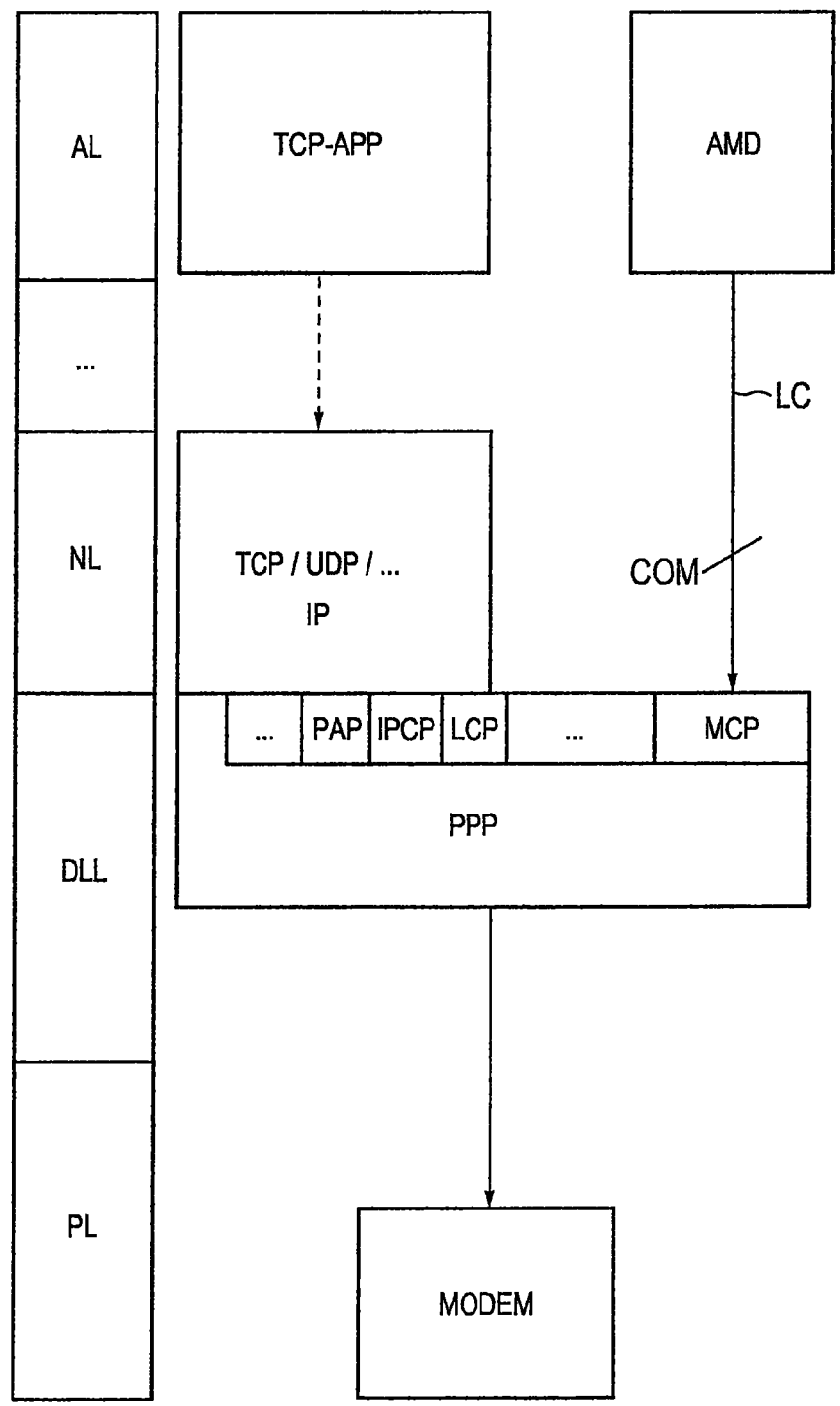

FIG. 5 by reference to the layer model shows a first embodiment. The layer model shown in this Figure is different than the layer model of FIG. 2. Unlike the layer model shown in FIG. 2, in the embodiment in FIG. 5 a device control protocol MCP is incorporated as a component in the PPP frame of the point-to-point protocol. That protocol MCP opens a logic channel between the application AMD in the application layer AL and the physical layer PL, that is to say the hardware component of the communication device MODEM. Data exchange between the application AMD and the hardware components of the device MODEM is thereby executed as part of the PPP communication. The communication device is thus in the data mode even when the application AMD is accessing the communication device or is sending or receiving data by way of the communication device.

In that case the control signal produced by the application AMD is communicated to the device MODEM as a packet identified by means of the MCP protocol. There the data packet is separated and outputs the control signal to the device MODEM. In particular a program for dividing up and forwarding inputs, a so-called parser, is used for the separation operation. Data transmission which is effected by way of PPP thus represents a logic channel LC and in addition a virtual serial interface COM for the application AMD for access to the communication device.

The device control protocol is basically also arranged at the position of the LCP field in the PPP frame. In this case that field marks the content of the useful data field contained in the PPP frame as a control signal for the communication device. The data stream transmitted by way of the PPP is represented in this case as a packet sequence in which packets on the one hand contain a conventional LCP field and which thus belong to the normal data stream and packets which transport control signals marked by the MCP field to the hardware of the communication device.

Figure 6:
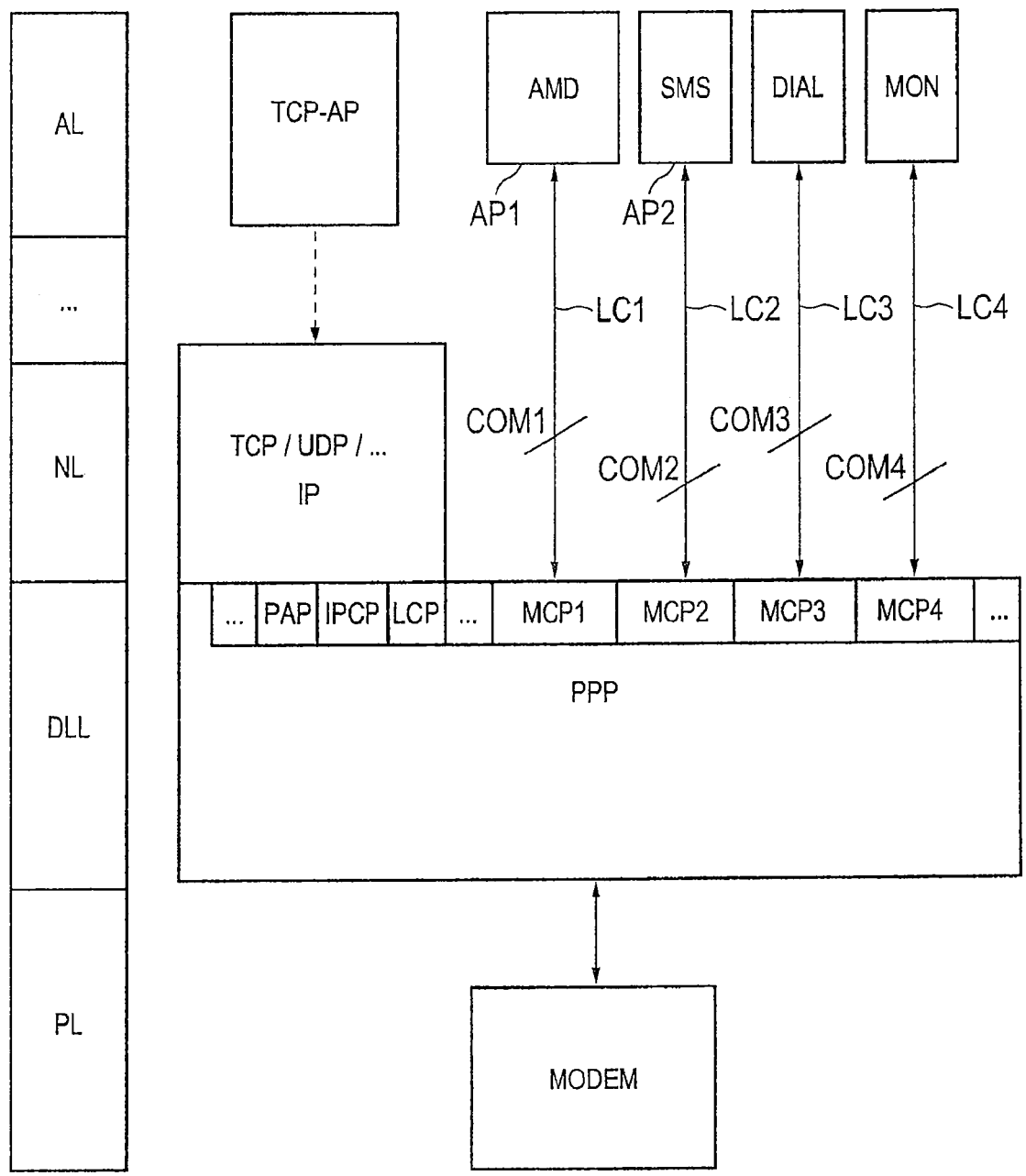

The PPP frame can in principle be expanded by a plurality of MCP protocols which can each be individually identified and separated and thus instanced. FIG. 6 shows this in an embodiment. In the layer model illustrated here the PPP frame is expanded by four different device control protocols MCP1, MCP2, MCP3 and MCP4. Each device control protocol thus respectively provides a logic channel LC1, LC2, LC3 and LC4 for the applications AMD, SMS, DIAL and MON from the application layer using the PPP frame or the PPP, by way of which those applications can respectively access the hardware of the device MODEM. Those logic channels are treated by the applications as virtual serial interfaces COM1 through COM4. Implementation of the PPP frame, in particular the precise number of the instanced MCP protocols, thus establishes the number of the 20 virtual serial interfaces which can be used in parallel at the communication device.

In the FIG. 6 embodiment that also means that both the application TCP-AP communicating by way of the protocol TCP, for example a browser, and also the application AMD, for example a setup program, can access the device MODEM in parallel, while for the application SMS, the application DIAL and by way of the application MON, services for short messages, telephony and monitoring also provide device resources of the communication device for a parallel access.

The layer model disclosed in FIG. 5 and in particular in FIG. 6 is particularly well suited for operation of a mobile device in the form of a personal digital assistant PDA. In that case the application TCP-AP, in dependence on the respectively occurring mobile radio network, is a GPRS or UMTS/HSDPA data service, or an application installed on the PDA, for example a browser adapted to the resources of the PDA.

In addition a PPP as described above with at least one PPP frame expanded by a device control protocol MCP is implemented on the PDA. An application installed on the PDA for producing and sending short messages accesses the hardware of the PDA by way of the device control protocol as the interface. That is implemented by a program for analyzing and forwarding inputs, that is to say a parser, for the data stream transmitted by way of the point-to-point protocol, being expanded by the device control protocol. The useful data which are filtered in that case are then applied to the above-mentioned virtual serial interfaces, that is to say interfaces COM1 through COM4 of the PDA. The application for producing and sending short messages addresses in that case those virtual serial interfaces and treats them like a physically provided serial interface known from the state of the art.

The method and communication device have been described by way of embodiments by way of example. Further configurations which are not a departure from the scope of the basic concept according to the invention are possible in the context of activity on the part of the man skilled in the art. Further configurations are set forth in the appendant claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

| List of references | |
|---|---|
| ADD | address |
| AMD | program for the management of data links for applications |
| AL | application layer |
| CNT | control |
| COM | virtual serial interface |
| DAT | useful data |
| DIAL | telephony |
| DLL | data link layer |
| FCS | check sum |
| Flag | boundary |
| LCP | link control protocol |
| MCP | device control protocol |
| MODEM | communication device |
| MON | monitoring program |
| MP | multiplexer |
| NL | network layer |
| PL | physical layer |
| PPP | point-to-point protocol |
| SMS | short message service |
| SWITCH | switching-over function |
| TCP-AP | application based on TCP/IP |

The invention claimed is:

1. A method comprising:
   integrating, by a communication device, a device control protocol (MCP) into a point-to-point-protocol (PPP) frame of a data link layer (DLL), wherein said point-to-point-protocol (PPP) frame comprises a link control protocol (LCP), and wherein the device control protocol (MCP) is integrated such that the integrated device control protocol (MCP) can be separated by means of an identifier of the device control protocol (MCP);
   providing, the device control protocol (MCP), a virtual serial interface for an application of an application layer (AL), the application associated with a mobile radio network;
   providing, via the integrated device control protocol (MCP), at least one logic channel between the application layer (AL) and a physical layer (PL) of the communication device;
   operating the application in a command mode, the operating including executing a data exchange between the application layer (AL) and the physical layer (PL) of the communication device as part of a point-to-point-protocol (PPP) communication via the integrated device control protocol (MCP); and
   maintaining a data mode of the communication device when the application operating in command mode is accessing the communication device.

2. The method of claim 1 further comprising:
   instancing at least two logic channels by means of the device control protocol for physical access of one or more of a first application and a second application from the application layer to the communication device.

3. The method of claim 1, comprising:
   accessing a modem of the communication device by said application associated with the mobile radio network via the virtual serial interface.

4. The method of claim 2, wherein said application associated with the mobile radio network is a first application formed as a General Packet Radio Service (GPRS) data service or a Universal Mobile Telecommunications System (UMTS) data service and a second application is a service configured to transmit speech or short messages, wherein at least one of the first application and the second application is configured to perform a data transmission via the virtual serial interface.

5. A communication device for executing communication processes using a point-to-point protocol (PPP) having a PPP frame of a data link layer (DLL), comprising:
   a processor; and
   at least one memory coupled to the processor, the memory having computer executable instructions thereon, that when executed by the processor, cause the processor to:
      provide at least one virtual serial interface configured to use a device control protocol (MCP) integrated into the PPP frame of the data link layer (DLL), wherein said PPP frame of the data link layer (DLL) comprises a link control protocol (LCP), wherein the device control protocol (MCP) is integrated such that the integrated device control protocol (MCP) can be separated by means of an identifier of the device control protocol (MCP), and wherein the at least one virtual serial interface includes at least one logic channel;
      operate an application in an application layer (AL) in a command mode, the application configured to access a unit of a physical layer (PL) of the communication device via a first logic channel of a first virtual serial interface, the application is associated with a mobile radio network;
      execute a data exchange between the application layer (AL) and the physical layer (PL) of the communication device as part of a point-to-point-protocol communication via the integrated device control protocol (MCP); and
      maintain a data mode of the communication device when the application operating in the command mode is accessing the communication device.

6. The communication device of claim 5, wherein the at least one logic channel of the at least one virtual serial interface is instanced such that a respectively independently executable access to the physical layer (PL) is possible by way of each virtual serial interface of the communication device.

7. The communication device of claim 5, wherein one or more of a dial-up application, a short message application, a telephony application, and a fax application can be executed by way of the at least one virtual serial interface.

8. The communication device of claim 5, wherein one or more of a speech application and a short message application can be executed by way of the at least one virtual serial interface.

9. The communication device of claim 5, wherein the communication device is a wired or wireless modem.

10. The communication device of claim 5, wherein the communication device is a personal digital assistant (PDA) for use in one or more of a GPRS and UMTS/High-Speed Downlink Packet Access (HSDPA) data service.

11. A non-transitory computer readable medium having computer executable instructions thereon, that when executed, cause a processor to:

integrate a device control protocol into a point-to-point-protocol frame of a data link layer, wherein said point-to-point-protocol frame comprises a link control protocol and wherein the device control protocol is integrated such that the integrated device control protocol can be separated by means of an identifier of the device control protocol;

provide, by the device control protocol, a virtual serial interface for an application of an application layer, the application associated with a mobile radio network;

provide, via the integrated device control protocol, at least one logic channel between the application layer and a physical layer of a communication device;

operate the application in a command mode, the operating including executing a data exchange between the application layer and the physical layer of the communication device as part of a point-to-point-protocol communication via the integrated device control protocol; and maintain a data mode of the communication device when the application operating in the command mode is accessing the communication device.

12. The non-transitory computer readable medium of claim 11 wherein the computer executable instructions thereon, when executed, further cause a processor to:

instance at least two logic channels using the device control protocol for physical access of one or more of a first application and a second application from the application layer to the communication device.

13. The non-transitory computer readable medium of claim 12, wherein the first application is a General Packet Radio Service (GPRS) data service or a Universal Mobile Telecommunications System (UMTS) data service and the second application is a service configured to transmit speech or short messages, wherein at least one of the first application and the second application is configured to perform a data transmission by way of the virtual serial interface.

14. The method of claim 1, wherein said application associated with the mobile radio network device is implemented with a parser or browser.

15. The method of claim 3, wherein said application associated with the mobile radio network is a service or a setup program associated with the mobile radio network and said application is abstracted from the modem.

* * * * *